No. 642,410. Patented Jan. 30, 1900.
C. YOUNG.
PROPELLING MECHANISM FOR VEHICLES.
(Application filed Mar. 28, 1898.)
(No Model.) 2 Sheets—Sheet 2.
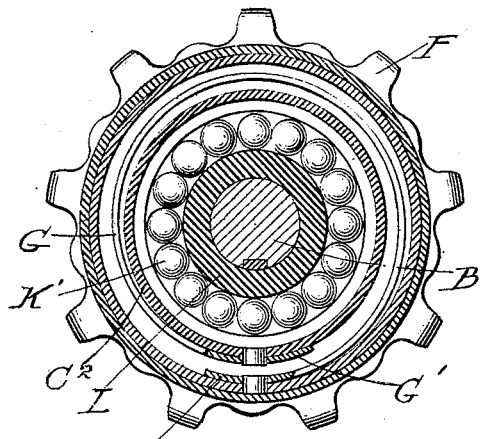
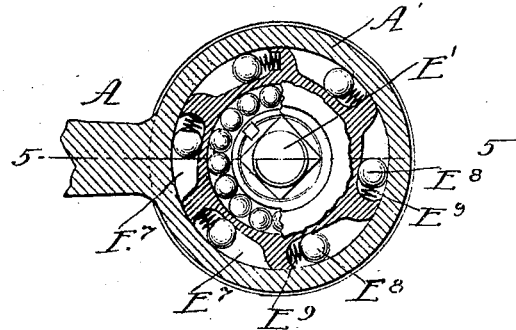
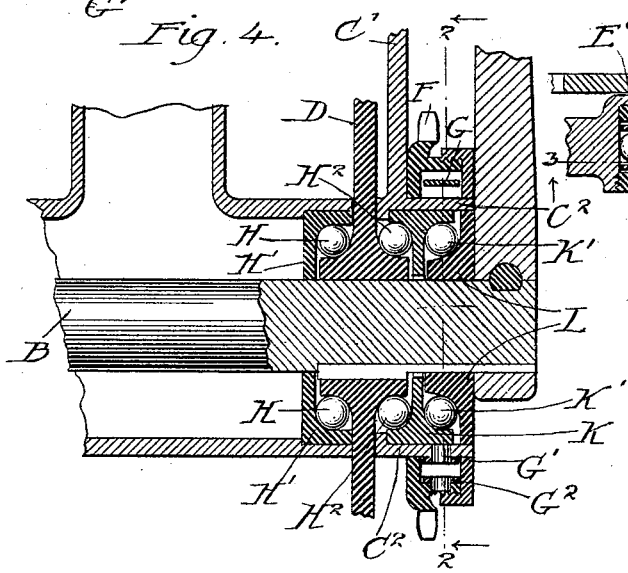
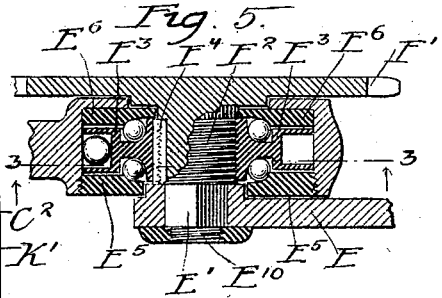
Witnesses:
Frank S. Blanchard
M. Thompson
Inventor:
Carl Young
By Attorney
Francis M. Ireland

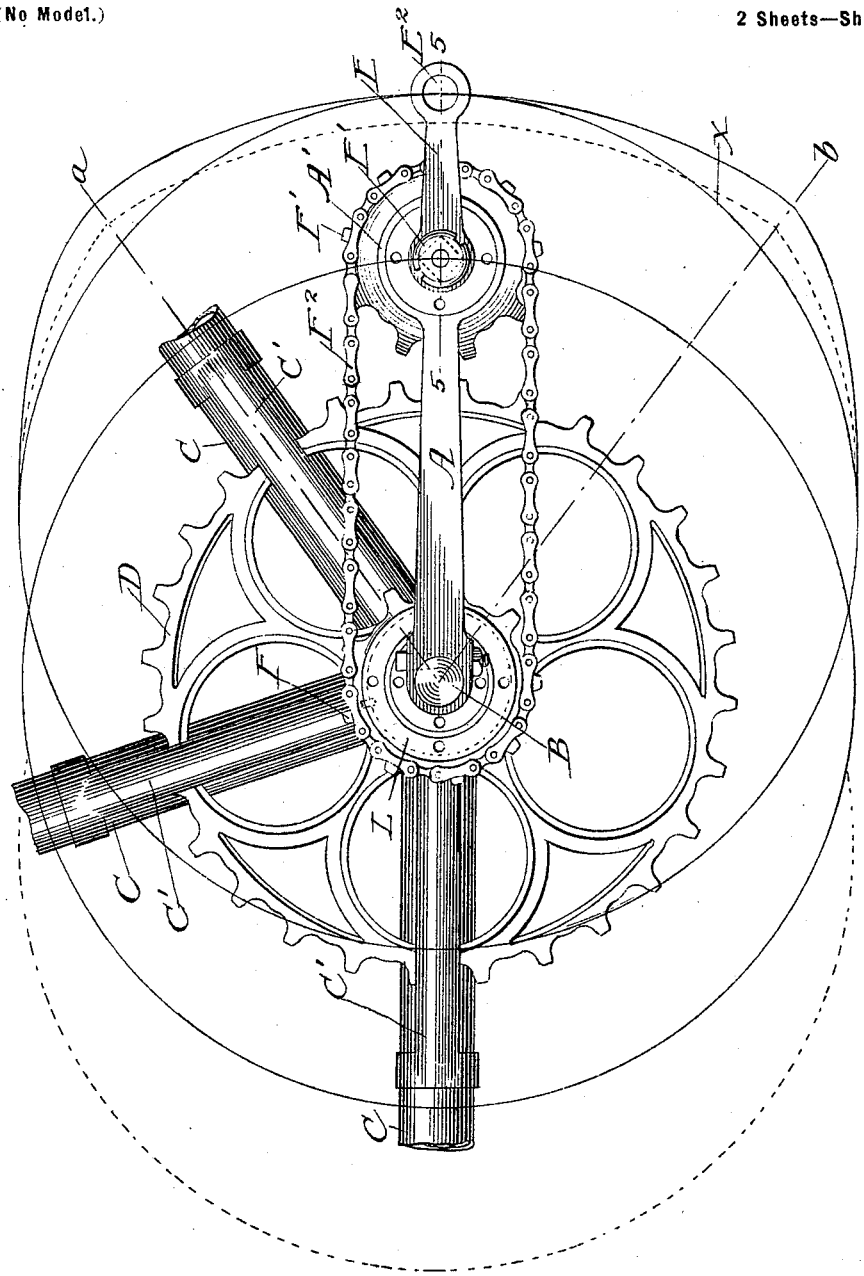

UNITED STATES PATENT OFFICE.

CARL YOUNG, OF CHICAGO, ILLINOIS.

PROPELLING MECHANISM FOR VEHICLES.

SPECIFICATION forming part of Letters Patent No. 642,410, dated January 30, 1900.

Application filed March 28, 1898. Serial No. 675,387. (No model.)

*To all whom it may concern:*

Be it known that I, CARL YOUNG, a citizen of the United States, residing at Chicago, in the county of Cook and State of Illinois, have invented certain new and useful Improvements in Propelling Mechanism for Vehicles, of which the following is a specification.

My invention relates to the propelling mechanism of vehicles, such as bicycles of the type having a main crank, with an auxiliary crank revolubly attached to the end of the main crank and adapted to be revolved, so as to lengthen the crank as a whole during the portion of its movement through which power is applied to it to propel the vehicle; and it has for its object to produce certain improvements in the construction of the parts of such a machine whereby it may be rendered more efficient.

In the drawings I have shown the propelling mechanism of a bicycle which embodies the essential ideas of my present invention and which I will now describe in detail.

Figure 1 is an elevation of the hanger portion of the frame of a bicycle and the propelling mechanism mounted therein. Fig. 2 is a section through the crank-shaft and associated parts, taken on line 2 2 of Fig. 4. Fig. 3 is a sectional view of the extremity of the main crank, showing the mounting of the auxiliary crank, such section being taken on line 3 3 of Fig. 5. Fig. 4 is a sectional view of the hanger and the mounting mechanism of the shaft. Fig. 5 is a section on line 5 5 of Fig. 3.

The same parts are indicated by the same letters in all the figures.

The crank A is keyed in the usual manner to the shaft B, supported in the hanger formed by the juncture of the frame-pieces C, carrying the sprocket-wheel D, which drives the main wheel of the bicycle in the usual manner. Instead, however, of having the pedal mounted in the usual manner at the extremity of the crank I provide the auxiliary crank E, which is revolubly mounted at the extremity of the main crank and carries at its extremity $E^2$ the pedal to which the power is applied.

It will be seen that the pedal may be revolved through a circumference about its axis at or near the extremity of the main crank and when so revolved will be extended outward beyond the extremity of the main crank through one portion of its movement and through another portion will be extended inward toward the shaft. This revolution may be automatically regulated so as practically to lengthen the crank as a whole during the downward portion of the stroke through which the power is applied and to shorten it during the remaining portion, so that the foot of the rider will move through substantially the same distance as though the pedal were upon the end of the main crank; but the length of the effective crank or lever is increased while the power is being applied. This is effected as follows: The auxiliary crank is mounted upon the shaft $E'$, which carries the sprocket-wheel $F'$, with which it may be formed integral, as shown. This sprocket-wheel $F'$ is connected by chain $F^2$ with sprocket F, attached to the main frame of the bicycle concentric with the shaft B, so that as the crank A revolves the sprocket-wheel $F'$ and the shaft $E'$ and pedal-crank E will turn relative to the strap or band $A'$ of the crank A, in which they are journaled. Now if the sprocket F were rigid with the main frame it is evident that the pedal would move through the circumference of a circle having the same diameter as the circumference through which the shaft $E'$ would move, but having its center forward of the shaft B by the length of the auxiliary crank. I have, however, provided a mechanism which somewhat alters this path, the aim being to have the auxiliary crank extended to its maximum position through a considerable portion of the downward stroke, as from $a$ to $b$, instead of at only one point in its stroke, thereby increasing the efficiency of the device. This is accomplished by having the sprocket F spring-mounted.

I will describe more in detail the mounting of the parts as seen in Figs. 2 and 4. The pieces $C'$ are bracketed to the tubes C of the main frame of the bicycle in the manner shown in Fig. 1 and form a support for the mechanism which I am now describing. $C^2$ is a hub or flange into which the ends of these bracketed pieces are united. The sprocket F fits loosely upon the outer surface of this flange. One end $G'$ of a coil-spring G is attached to the flange $C^2$, and the other end $G^2$ of such spring is attached to the sprocket F. It will thus be seen that the sprocket F is attached to the stationary flange $C^2$; but it is attached through the medium of the spring G, so that it may be turned through a portion of a revolution, or, in other words, it has a yielding attachment to the frame of the bicycle.

Of course all the parts which revolve are provided with ball-bearings. The sprocket-wheel D has the balls H between it and the cup H' and balls $H^2$ between it and the cup K. The balls K' rest between this cup K and the cone L.

I will now describe more in detail the mounting of the auxiliary crank.

The main crank A ends in the strap or band A', and the shaft E' of the auxiliary crank passes through and is mounted within such strap or band. This shaft E' is formed integral with the sprocket-wheel F' and is formed with a square portion, over which the crank E, having a hole to correspond in shape with such portion of the shaft, is slipped. The nut $E^{10}$ may be screw-threaded upon the extremity of the shaft to hold the auxiliary crank in place. This shaft E' is threaded at its central portion $E^2$ to receive what I term the "clutch-hub" $E^3$, which is screwed thereon and keyed thereto at $E^4$. This clutch-hub is loose within the strap A' and is supported in ball-bearings by the cones $E^5$ $E^6$. In the perimeter of this clutch-hub are the pockets $E^7$, shaped as shown, and within these pockets are balls $E^8$, held at the point of contact by the springs $E^9$.

The operation of my invention may be described as follows: As shown in Fig. 1, the parts are in the position which they will be in at the central portion of the downward stroke, the power being applied to the pedal at the point $E^2$ by the foot of the rider. Commencing at this point, we will follow the operation through one cycle. The clutch mechanism between the shaft of the auxiliary crank and the strap within which it is mounted is now locked, and the auxiliary crank is therefore rigid with the main crank, and the whole acts as if it were one integral lever. When the point b is reached in the movement of the pedal and crank, the pressure of the foot of the rider is relaxed or removed, and the action of the coil-spring will thereupon turn the sprocket F back into its normal position. This operation will turn the shaft carrying the auxiliary crank back, so that the point $E^2$ will lie in the circumference X, which circumference represents the path the point $E^2$ would follow throughout its revolution if it were not for the action of the coil-spring. It will travel along this circumference until a point which I have designated on the drawings as a is reached, such point being the point at which the rider begins to apply power to the pedal. The sprocket F will be turned against the action of the spring until (when the parts are adjusted properly) the auxiliary crank is extended in line with the main crank, as shown in Fig. 1, whereupon the operation of the clutch makes the connection between the two cranks rigid, and such rigidity is maintained so long as the power is applied.

What I claim as new, and desire to secure by Letters Patent, is—

1. In a propelling mechanism for a vehicle, the driving-shaft, the cup K surrounding the shaft, and the bracketed portions secured to the frame of the vehicle at their outer ends and having their inner ends provided with hubs or flanges which surround the cups, combined with the sprocket-wheel F placed upon the hub or flange, an intermediate spring having one end connected to the sprocket and the other to the hub or flange, and a crank mechanism which is operated from said sprocket, substantially as set forth.

2. In a propelling mechanism for a vehicle, the main crank provided with a strap or band upon its outer end, a sprocket F' formed integral with its shaft, and the auxiliary crank rigidly connected to the outer end of the shaft, combined with a clutch-hub rigidly secured to the shaft and loose within the strap or band, suitable ball-bearings, and clutch-balls which engage with the strap or band, a chain which passes around the said sprocket, the sprocket-wheel F which is yieldably mounted on the frame and around which the chain passes, and the sprocket-wheel D which is mounted upon the driving-shaft and is keyed thereto, substantially as shown.

3. In a propelling mechanism for a vehicle, the bracketed portion C' provided with the flange $C^2$ upon its inner end, the cup placed inside of the flange $C^2$, the balls H, $H^2$, K', the cone L, and the sprocket-wheel D keyed to the shaft combined with the sprocket-wheel F yieldingly mounted upon the flange $C^2$ the spring which unites the sprocket-wheel and the flange $C^2$, and a mechanism mounted upon the crank, and which is operated by the sprocket F, substantially as described.

Chicago, Illinois, March 18, 1898.

CARL YOUNG.

Witnesses:
FRANCIS M. IRELAND,
M. THOMPSON.